March 8, 1938.  L. M. HODGES  2,110,524
ROTARY ENGINE
Filed Aug. 6, 1936  5 Sheets-Sheet 1

INVENTOR.
L. M. Hodges
BY Watson E. Coleman
ATTORNEY.

March 8, 1938.  L. M. HODGES  2,110,524

ROTARY ENGINE

Filed Aug. 6, 1936  5 Sheets-Sheet 3

INVENTOR.
L. M. Hodges

BY Watson E. Coleman
ATTORNEY.

March 8, 1938.  L. M. HODGES  2,110,524
ROTARY ENGINE
Filed Aug. 6, 1936   5 Sheets—Sheet 5

Inventor
L. M. Hodges
By Watson E. Coleman
Attorney

Patented Mar. 8, 1938

2,110,524

UNITED STATES PATENT OFFICE 2,110,524

ROTARY ENGINE

Lowell M. Hodges, Clinton, Mo.

Application August 6, 1936, Serial No. 94,700

13 Claims. (Cl. 123—8)

This invention relates to the class of engines and pertains particularly to a rotary engine designed to be operated by steam or an ignited fuel mixture.

The primary object of the present invention is to provide a rotary engine having pistons which rotate continuously in the same direction about the axis of the power shaft.

Another object of the invention is to provide a rotary engine having continuous circular cylinders in which pistons move, and which are designed to rotate with a power shaft through which power is delivered to mechanism with which the engine may be coupled.

Still another object of the invention is to provide a rotary engine having concentric annular cylinders in each of which a piston is located, and in which one of the cylinders constitutes a compression chamber and the other an explosion and expansion chamber.

A still further object of the invention is to provide in a rotary engine having annular cylinders of the character described, a novel means of partitioning the cylinders to provide chambers in which compression and expansion of the gases may take place, in which the said partitioning means is so designed as to permit the free passage of the pistons throughout the circular areas of the cylinders.

Still another object of the invention is to provide a rotary engine, comprising a pair of annular cylinders concentrically arranged upon and secured to a power shaft to turn therewith, and pistons in the cylinders coupled together for concerted movement and connected with a means disposed exteriorly of the cylinders whereby the pistons and cylinders may have relative movement.

Another object is to provide a structure of the above described character, having novel means for successively partitioning and opening the cylinders in advance of and behind the pistons whereby to divide the cylinders into chambers in which compression of a fuel charge may take place, and in which ignition and expansion of the fuel charge behind a piston may occur to effect the relative movement of the pistons and the cylinders.

Another object is to provide a novel means of transferring a compressed fuel charge from one annular cylinder to the other and into an area of the said other cylinder between a piston and a partitioning unit.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

Referring now more particularly to the drawings wherein like numerals designate corresponding parts throughout the several views, the numeral 1 generally designates a supporting frame for a double cylinder form of the engine structure embodying the present invention.

The double cylinder form of the engine comprises two annular cylinders which are arranged concentrically one within the other and which are indicated generally by the numerals 2 and 3. These cylinders are divided on a plane passing centrally therethrough and transversely of the axial centers thereof to form the halves 2ª and 2ᵇ for the cylinder 2, and 3ª and 3ᵇ for the cylinder 3. The cylinder 2 constitutes the expansion cylinder through which moves the pistons, hereinafter described, which receive the expansive propelling power of the fuel or other medium which is introduced for the operation of the engine, and the cylinder 3 constitutes the compression cylinder in which moves the pistons, hereinafter described, which compress an explosive fuel charge which is subsequently transferred to cylinder 2.

The portions 2ᵇ and 3ᵇ of cylinders 2 and 3 have cast integral therewith the flanges 4 and 4ª while the portions 2ª and 3ª of cylinders 2 and 3 have the integral flanges 5 and 5ª, and these latter flanges are bolted by means of the bolts 6, to the flanges 4 and 4ª to form the complete annular cylinders. The portions 4ª have integrally connected therewith the engine cylinder mounting arms 11 which extend inwardly to the hub 12 through which passes the main drive shaft 13 to which the hub 12 is securely fastened by the key 71 illustrated in Figure 1.

Figure 2:
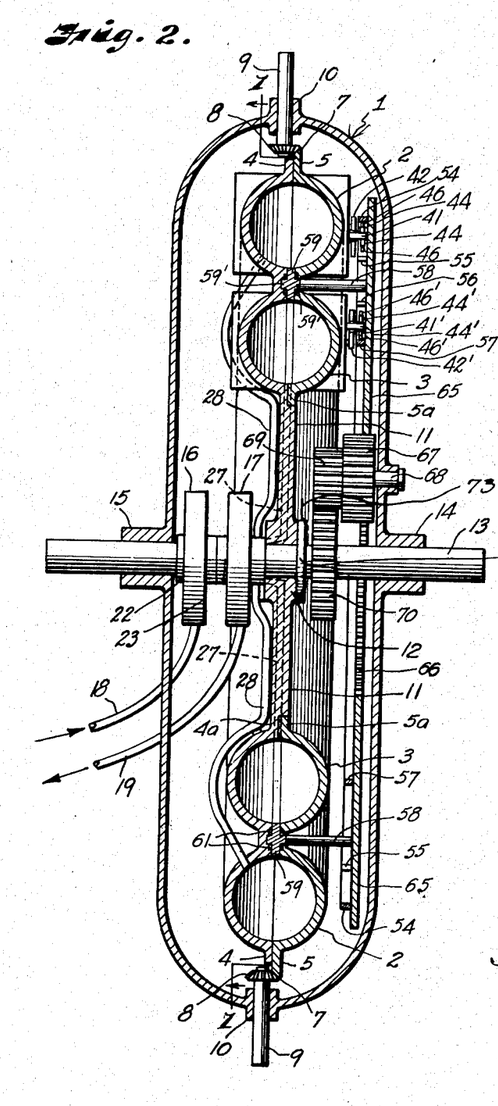
Figure 2 is a vertical sectional view through the engine and the supporting frame therefor taken substantially on line 2—2 of Fig. 1.
Figure 3:
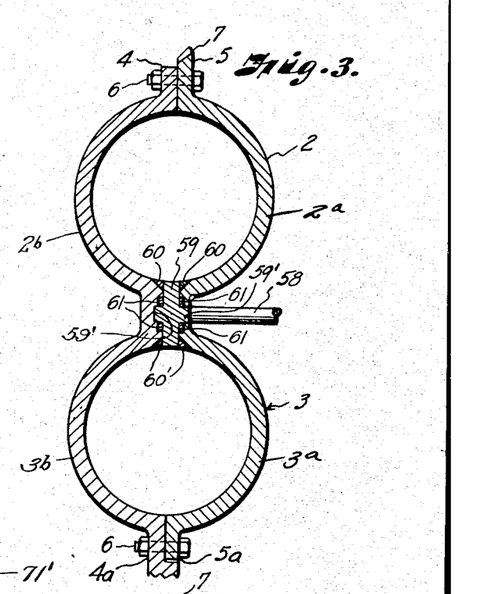
Figure 3 is a view in transverse section, upon an enlarged scale, of the expansion and compression chambers, showing in detail the mounting for the pistons of the chambers.
Figure 4:
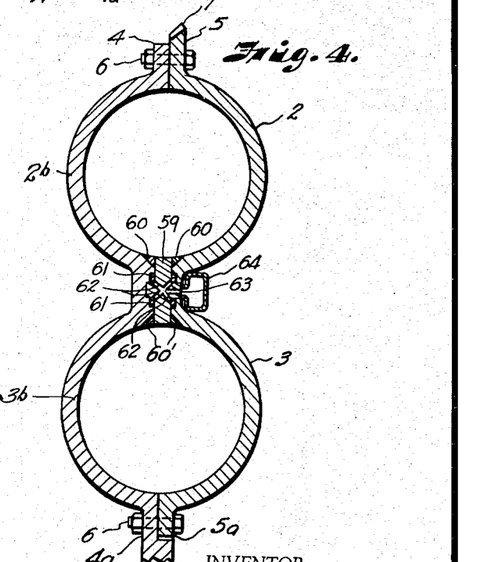
Figure 4 is a sectional view similar to Figure 3 but illustrating a means whereby lubricant may be supplied to the piston carrying annulus and to the interior of the annular cylinder whereby the pistons will be lubricated therein.

The flange 5 extends outwardly beyond the flange 4, as illustrated in Figures 2 to 4, and is formed to provide the beveled gear teeth 7. Meshing with the teeth 7 are beveled gears 8, each of which is carried upon a shaft 9, which passes through a bearing 10 forming an integral part of the frame 1, and this same frame is provided with the bearings 14 and 15 through which the shaft 13 passes for the support of the engine.

Figures 1, 9:
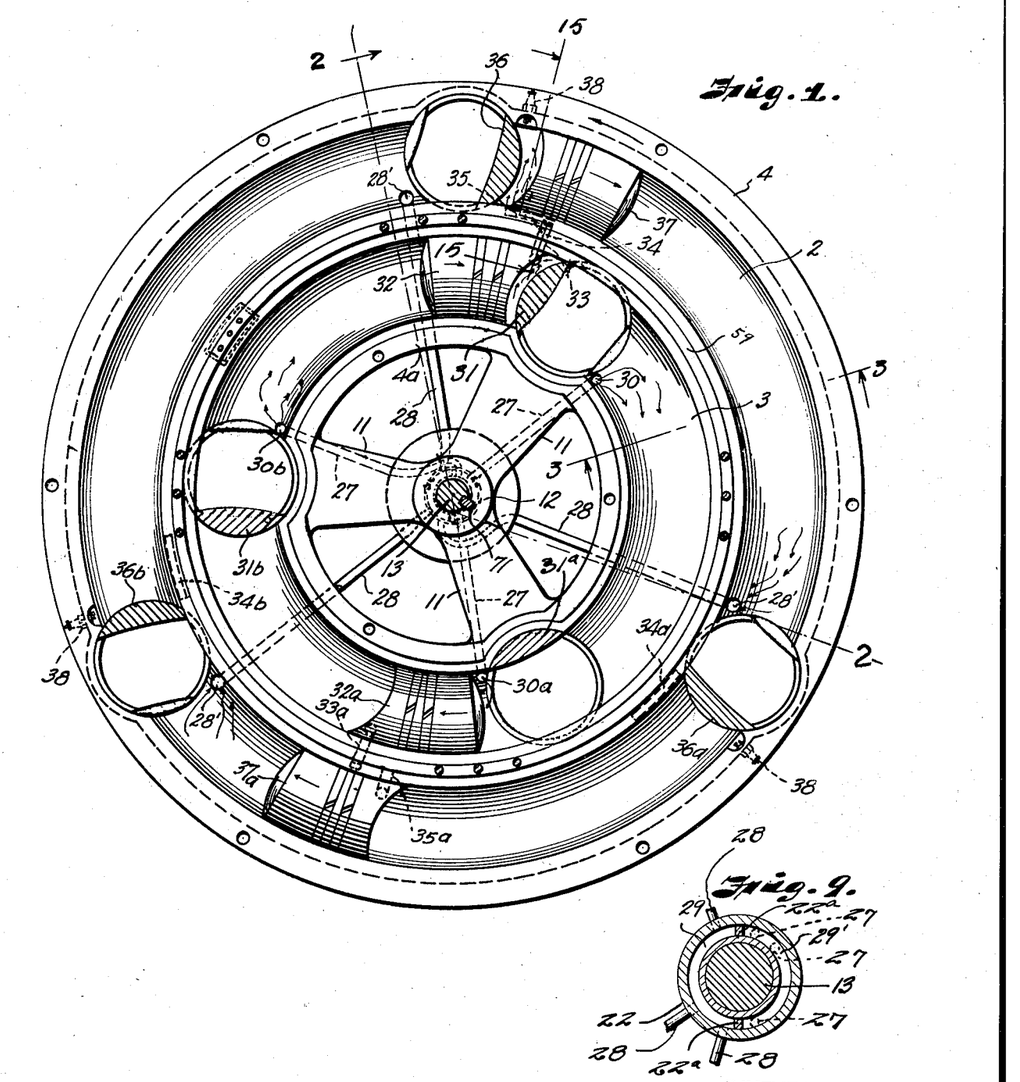
Figure 1 is a view taken through the engine on a plane at right angles to the rotary axis of the annular cylinders, showing the interior halves of the two cylinders and the pistons therein.
Figure 9 is a section on the line 9—9 of Figure 8.
Figure 8:
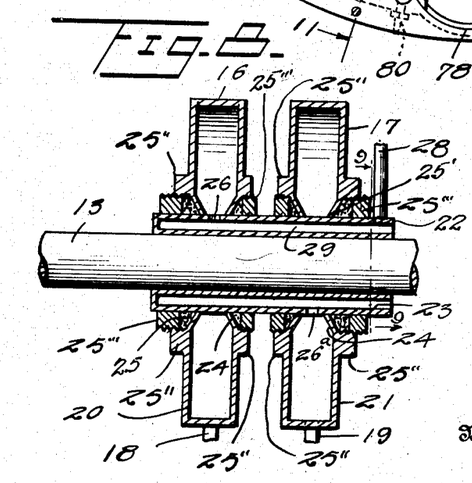
Figure 8 is a sectional view taken on a plane paralleling the engine drive shaft, through the intake and exhaust manifolds.

The numerals 16 and 17 designate annular boxes or housings which represent, respectively, the intake and exhaust manifolds for the engine and these have connected therewith the fuel supply pipe 18 and the exhaust pipe 19, respectively. These boxes or housings 16 and 17 are of annular formation and are tapered inwardly at their inner sides, as indicated at 24, which tapered sides are engaged by the rings 25 and 25' of packing material. The boxes 16 and 17 have formed integral therewith the oppositely directed hubs 25" which encircle the packing rings 25 and 25' and which are interiorly threaded as illustrated to receive annular exteriorly threaded packing nuts 25'". The inner walls of the boxes or housings 16 and 17 are open, as shown in Figure 8, and these boxes encircle and contact the outer surface of the cylindrical casing 22 about which casing the annular packing rings 25 and 25' are placed. This cylindrical casing is mounted on and has the shaft 13 passing therethrough and in the form illustrated has one end open as indicated at 23, and in abutting relation with the adjacent side of the hub 12 as illustrated in Figure 2. However, it is to be understood that this cylinder may be formed integral with the hub if desired. The casing 22 is provided, as illustrated in Figure 9, with the diametrically oppositely positioned longitudinally extending partitions 22ª thus dividing the casing into the two chambers 29 and 29' which form respectively exhaust and intake chambers. The hub 12 of the engine and the arms 11 have fuel intake passages 27 formed therethrough, the lower ends of the passages opening through the side face of the hub toward which the open end 23 of the casing 22 is directed and opening into the chamber 29', while the other ends of the passages 27 open at the points 30, 30ª and 30ᵇ into the compression cylinder 3. The outer wall of that part of the casing 22 forming a portion of the intake chamber 29' is provided with a port 26 which opens into the intake manifold 16 and the wall of the casing 22 at the opposite side has a port 26ª which opens from the exhaust chamber 29 into the exhaust manifold 17.

The numeral 28 indicates an exhaust pipe of which there are three which lead radially from the inner end of the casing 22 upon the side constituting the exhaust chamber 29, to ports 28' which open into the expansion cylinder 2. Exhaust gases passing from the expansion cylinder through these tubes 28 will enter the exhaust chamber 29 and be carried off by way of the passage 26ª, the exhaust manifold 17 and the exhaust pipe 19.

At equi-distantly spaced points around the annular compression cylinder 3, there are disposed the cylindrical partitioning units or abutment valves 31, 31ª and 31ᵇ. These partitioning units are mounted for oscillation in the walls of the compression cylinder and each has a passage transversely therethrough which conforms in curvature with the contour of the cylinder 3, so that when the cylindrical partition is rotated to one position, the passage therethrough, which is of circular cross-section, will coincide with the interior diameter of the cylinder 3 to permit a piston or vane to pass. When the cylindrical partitions are turned in the opposite direction, the portion of the wall thereof which is disposed at the inner side of the annular cylinder when the partition is in the open position described, will be disposed transversely of the interior of the annular cylinder to close the same, as illustrated in Figure 1, reference being had particularly to the cylindrical partitions 31 and 31ᵇ, the partition 31ª being shown in open position.

At equi-distantly spaced points through the circumference of the outer annular cylinder or expansion cylinder, there are the rotatably mounted cylindrical partitions or abutment valves 36, 36ª and 36ᵇ, each of which is formed like the previously mentioned cylindrical partitions, with a circular passage transversely therethrough which, when the partition is rotated to one position, coincides with the interior diameter of the cylinder to allow a piston to pass. Each of these cylindrical partitions has one wall which is adapted, when the partitions are in cylinder closing or partitioning position, to extend across the annular cylinder, as illustrated in Figure 1, where each of the partitions is in closed position.

As illustrated in Figure 1, each of the cylindrical partitions of the inner or compression cylinder is in relatively close relation with the partitioning cylinder of the outer or expansion cylinder or, in other words, the inner partitioning cylinders are disposed on radial lines which are offset slightly from and in advance of the radial lines upon which the cylindrical partitions of the outer annular cylinder are disposed. It will also be noted, if the ports 28' and 30 be alternately considered, passing around the cylinders in a clockwise direction, that the ports 28' are disposed behind the partitioning cylinders 36 while the ports 30, 30ª and 30ᵇ, previously referred to generally as ports 30, are each immediately in front of a partitioning cylinder.

Immediately in advance of each of the cylindrical partitions extending across the outer annular cylinder 2 is a sparking device 38 such as the usual spark plug employed in an internal combustion engine and by which a charge of combustible fuel is ignited at the proper moment by any suitable timing mechanism. One form of such mechanism is here illustrated and comprises an annular body of insulation 71' which has metallic inserts 72, one for each of the firing or spark plugs 38 and each of which is connected by a wire 73 which passes to a plug. This annular body 71' may be mounted upon the side of the hub 12 to turn with the same and mounted upon the shaft 13 and within the annular body 71' is a collar 74 having the rotor contacts 75, which may be supplied with electric current in any suitable manner as by an insulated conductor 76 which may pass longitudinally along the shaft to turn therewith.

Figure 6:
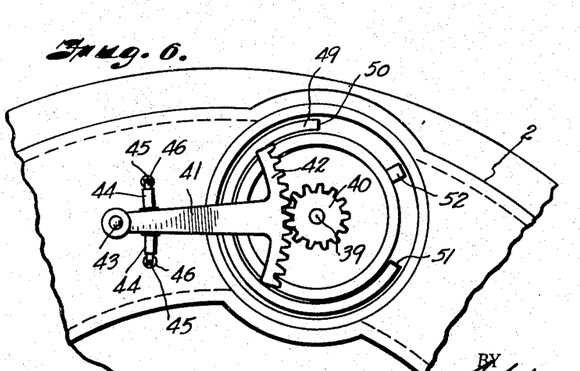
Figure 6 is a view in side elevation of an annular cylinder showing the exterior mechanism connected with one valve or partition.
Figure 7:
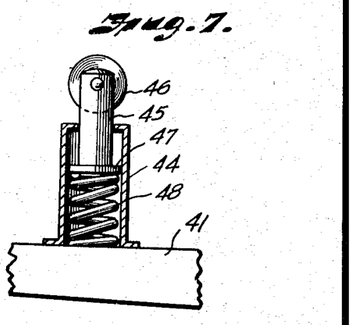
Figure 7 is a sectional view through a roller contact and supporting means therefor, which is associated with a partitioning valve actuating arm.

At the outer end of each of the cylindrical partitions of both of the annular cylinders, there is a stub shaft 39 upon which is mounted a spur gear 40. An arm 41 having a toothed rack 42 on one end, is pivotally mounted at its other end upon a pin 43 carried by and projecting from the adjacent side of the cylinder. The toothed rack 42 is in mesh with the spur gear 40, as illustrated in Figure 6, and as is indicated by the shading upon the arm 41, approximately one-half of the arm from the pivot point 43 toward the rack carrying end, is set out away from the cylinder beyond the rack 42 and gear 40.

Upon the top and bottom edge of each arm 41 in the area adjacent the pivot 43, there is a tubular housing 44 in which is reciprocably disposed a pin 45, upon the outer end of which a roller 46 is mounted. Upon the inner end of this pin is a plate 47 which bears against one end of an expansion spring 48 which is housed in the cylinder 44. As illustrated in Figure 6, these spring housing cylinders 44 are extended in opposite directions from the arm 41 and substantially in a line extending radially of the engine. Secured adjacent the end of each cylindrical partition beneath the arm 41 and concentric with the stub shaft 39 is a broken annulus 49, between the ends 50 and 51 of which moves a partition movement limiting key 52, which is carried upon the adjacent end of the cylindrical partition and contacts alternately with the ends 50 and 51 in the operation of the partition. Mounted upon the stub shaft 68 which is secured in a suitable bearing in the frame 1, are the two gears 67 and 69, the gear 69 meshing with the gear 70 secured to the shaft 13.

Interposed between the annular cylinders 2 and 3 is a ring 59, the outer edge of which is exposed to the interior of the expansion cylinder 2, while the inner edge is exposed to the interior of the inner or compression cylinder 3, and this ring is bordered on each side and in each cylinder by packing 60 which is disposed in a suitable recess, or "countersunk" in the surface of the cylinder.

Extending from the annular ring 59, at spaced intervals, are mounting arms 58 which are secured to a circular plate or body 65 which is disposed at one side of the cylinders and which has a central opening through the center of which the shaft 13 passes. The edge of the opening in the plate 65 is toothed, as indicated at 66, and the teeth of this edge are in mesh with the teeth of the gear 67.

The ring upon each side face has a central rib 59' which is bordered upon each side by a sealing ring 61 which is placed in a suitable recess, or "countersunk", in the opposing wall of the cylinder, and this ring 59 is adapted to move about the shaft 13 as a center and relatively to the cylinders 2 and 3, between the confronting portions which the ring 59 separates.

In the radial area lying between each two adjacent partitioning cylinders 31 and 36, a face of the portion of the structure connecting the parts 2ᵇ and 3ᵇ which is covered by the ring 59, is provided with a short circumferentially extending fuel by-pass passage 34.

Within each of the annular cylinders is one or more pistons, there being illustrated in Figure 2, two pistons 37 and 37ª in the cylinder 2 and two pistons 32 and 32ª in the cylinder 3. These pistons are diametrically oppositely disposed and are arranged relatively so that their ends are in overlapping relation on a line extending radially of the engine. Each two adjacent pistons are secured to the ring 59 so that they will move together with this ring, and as is shown in Figure 1, passages 33 and 33ª lead from the pistons 32 and 32ª, respectively, into the ring 59 and open through the side thereof which opposes the face of the portion of the structure between the cylinders in which the passages 34, 34ª and 34ᵇ are formed. A similar passage opens from the rear face of each of the pistons 37 and 37ª and leads through the same into the adjacent ring 59 to open laterally from the ring in the same direction as the passages 33 and 33ª. It will thus be seen that when a pair of pistons is in a certain position, such as the position in which the pistons 32 and 37 are shown in Figure 1, the passages leading from the two pistons will be in communication through the adjacent circumferentially extending passages formed in the body of the material which connects the cylinders together so as to permit fuel gas or other propellant to pass from one cylinder to the other.

Figure 5:
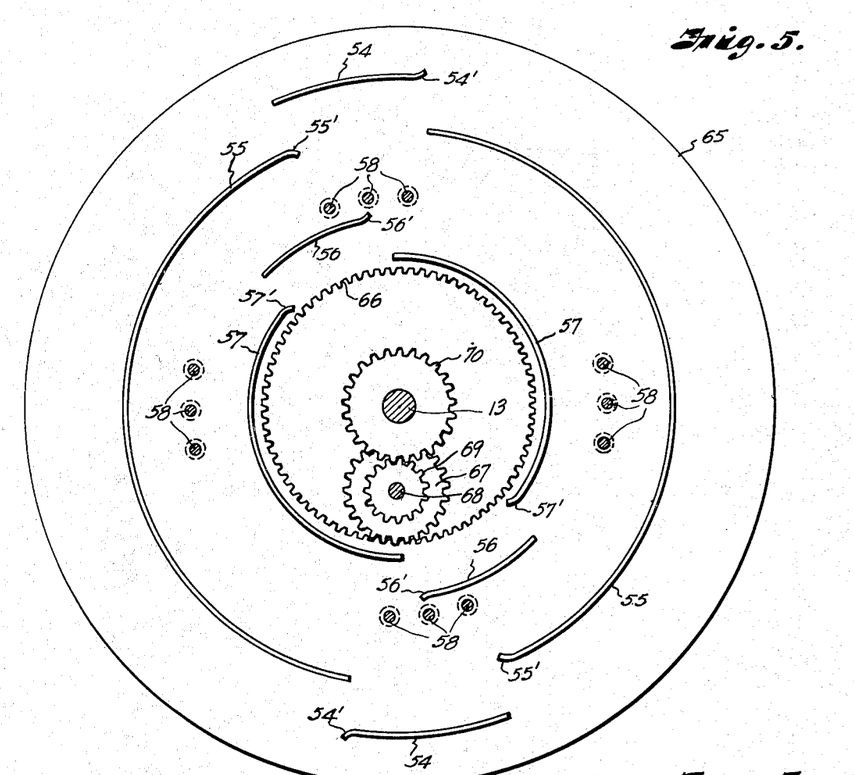
Figure 5 is a view in elevation of one side of the plate carrying the mechanism for timing the opening and closing of the partitioning abutment valves.

Upon the face of the disk 65 which opposes the cylinders 2 and 3 are the radially spaced ribs 54, 55, 56 and 57. As shown in Figure 5, there are two of each of these ribs and the ribs 54 and 56 are relatively short but are at diametrically opposite points and are disposed upon the same circular path, while the ribs 55 and 57 are long and are upon the same circular paths, the ends of the ribs 55 and 57 being on the same line radially of the plate respectively, with the short ribs 54 and 56. In other words, the short ribs 54 are radially spaced from the paths of the long ribs 55 but extend across the areas between the opposing ends of these long ribs 55 and the short ribs 56 which lie upon annular paths inside of the ribs 55, have the same relation with the spaced ends of the ribs 57. The outer two pairs of ribs 54 and 55 are designed to engage the rollers 46 upon those arms 41 which are connected by the rack and pinion with the expansion cylinder controlling partitions 36, 36ª and 36ᵇ, while the ribs 56 and 57 engage with the rollers of those arms which are connected by rack and pinion with the partitions of the compression cylinder, and as illustrated in Figure 5, the ends of the several ribs which are in advance or which lead in the rotation of the ribs with the plates 65 are turned slightly, as indicated at 54', 55', 56' and 57' to facilitate the passage of the rollers 46 onto the ribs. Thus, in the operation of the engine in the manner hereinafter to be described, the short ribs 54 and 56 will engage the rollers on the outer sides of the several arms associated with the oscillating partition members to open the partitions for the passage of a piston from one side of the partition to the other, after which the outside rollers will free the short ribs and the rollers at the opposite sides of the arms will immediately be engaged by the adjacent and following long rib to actuate the arms in the opposite direction and rotate the partition cylinders to closed position. Since the oscillation of the rotating partitions must be extremely rapid, the keys 52 serve through their contact alternately with the ends 50 and 51 of the broken ring 49, to check or limit the movements of the partitions.

In the operation of the engine, the pairs of pistons in the compression and expansion cylinders move together through the cylinders and as will be readily apparent from the foregoing description, the cylinders rotate as well as the pistons. One piston in the expansion cylinder and the adjacent piston in the compression cylinder constitute a pair, and referring to Figure 1, it will be seen that the driving piston 37, which with the piston 32 moves in a clockwise direction while the cylinders moved counterclockwise, has just passed through the valve partition 36 and the latter by means of the mechanism previously described, has been immediately closed so that an extremely small area exists between the piston 37 and the partition 36. The piston 32, however, is only just approaching the partition 31 and fuel gases previously introduced through the port 30ᵇ are being compressed between the piston 32 and the cylinder partitioning valve body 31. However, with the pistons 32 and 37 in the position shown, it will be seen that the passageways 33, 34 and 35 are all in communication so that explosive gases compressed between the piston 32 and partition 31 may flow into the area between the piston 37 and the partition 36, and as soon as these gases have been transferred in this manner from the compression to the expansion cylinders, the spark plug 38 adjacent the partition 36 will receive current by the timing mechanism to ignite the mixture, thus forcing the piston 37 to move in a clockwise manner and the cylinders to move in the opposite direction or counterclockwise, the exploded gases expanding in the area between the partition 36 and the piston 37. As soon as the fuel gases have been transferred in the manner described and the explosion has taken place or is in the process of taking place, the partitioning valve controlling mechanism at the side of the cylinders will operate to turn the partition 31, so that the passage therethrough will coincide with the cylinder 3 and allow the piston 32 to pass through to the opposite side of the partition 31, whereupon the latter partition will immediately close. As the piston 37 moves relatively in the cylinder 2 between the partitions 36 and 36ª, the spent gases of a previous explosion will be forced outwardly through the port 28' and the pipe 28, and as the piston 32 moves through the cylinder 3 between the partitions 31 and 31ª, it will draw in a new fuel charge through the port 30 and by compressing another charge ahead of it between it and the partition 31ª, it will be closed. In Figure 1, the partition 31ª is shown open as the piston 32ª has just passed through, but this partition 31ª will be immediately closed so that the fuel charge which is present in the area of the cylinder 3 behind the piston 32ª will be compressed against the wall of the partition 31ª by the compressing piston 32, which will be moving toward this partition.

In order that the contacting relatively moving surfaces of the annulus 59 and the adjacent cylinder parts may be properly lubricated, there are formed the lubricant conveying grooves or channels 62 and 63, as illustrated in Figure 4, which lead to the packing rings 61, and there is fixed to the annulus 59 between the cylinder portions 2ª and 3ª, the receptacle 64 which has an outlet leading into the passage 63 and from which lubricant may be carried to the passages 62 which conduct it to the packing rings as described.

From the foregoing, it will be readily apparent that the pistons and the cylinders have relative movement and that both rotate about the axle 13, the cylinders being fixed to and rotating with the axle, while the pistons rotate in the opposite direction and through the medium of the gear mechanism 67 to 70, the necessary relative movement is given to the plate 65 to effect the actuation of the partitioning valves in the proper manner and at the correct intervals, so that the operation of the engine may be smooth and continuous.

By providing the ring gear 7 and the beveled gears 8 upon the shafts 9, additional power can be taken off from the engine to that taken off from the shaft 13.

Figure 10:
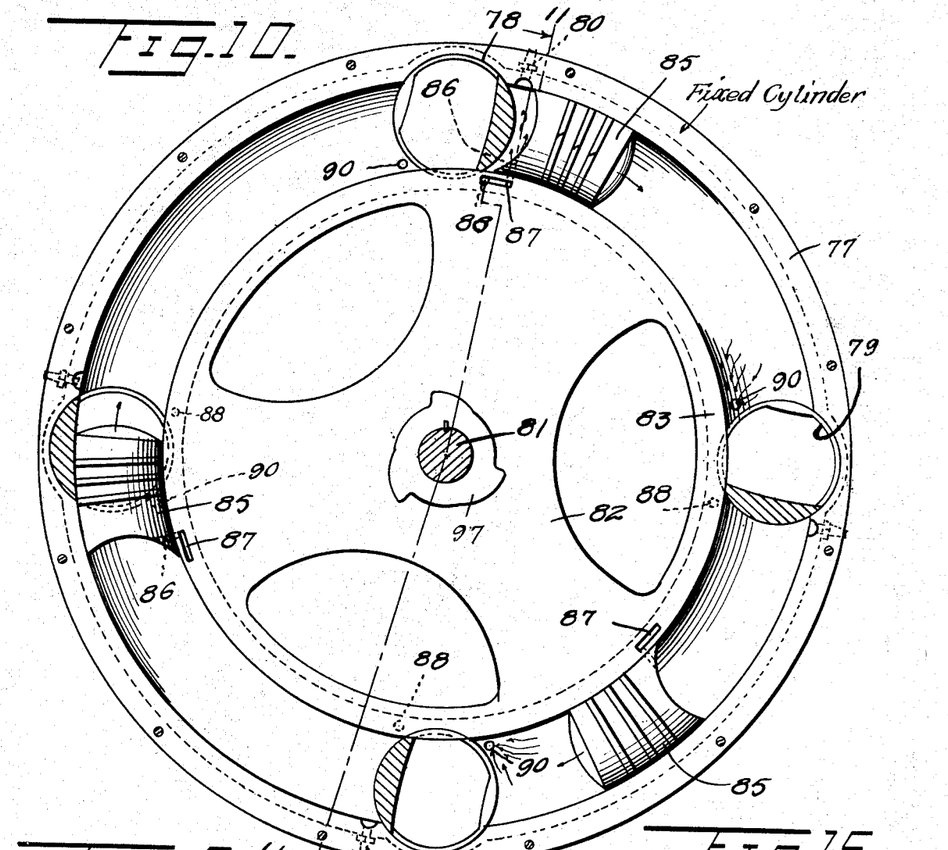
Figure 10 is a view partly in section and partly in elevation of the single cylinder form of the engine, the section being taken on a plane extending perpendicularly to the axis of rotation of the piston.
Figures 11, 12, 13, 14:
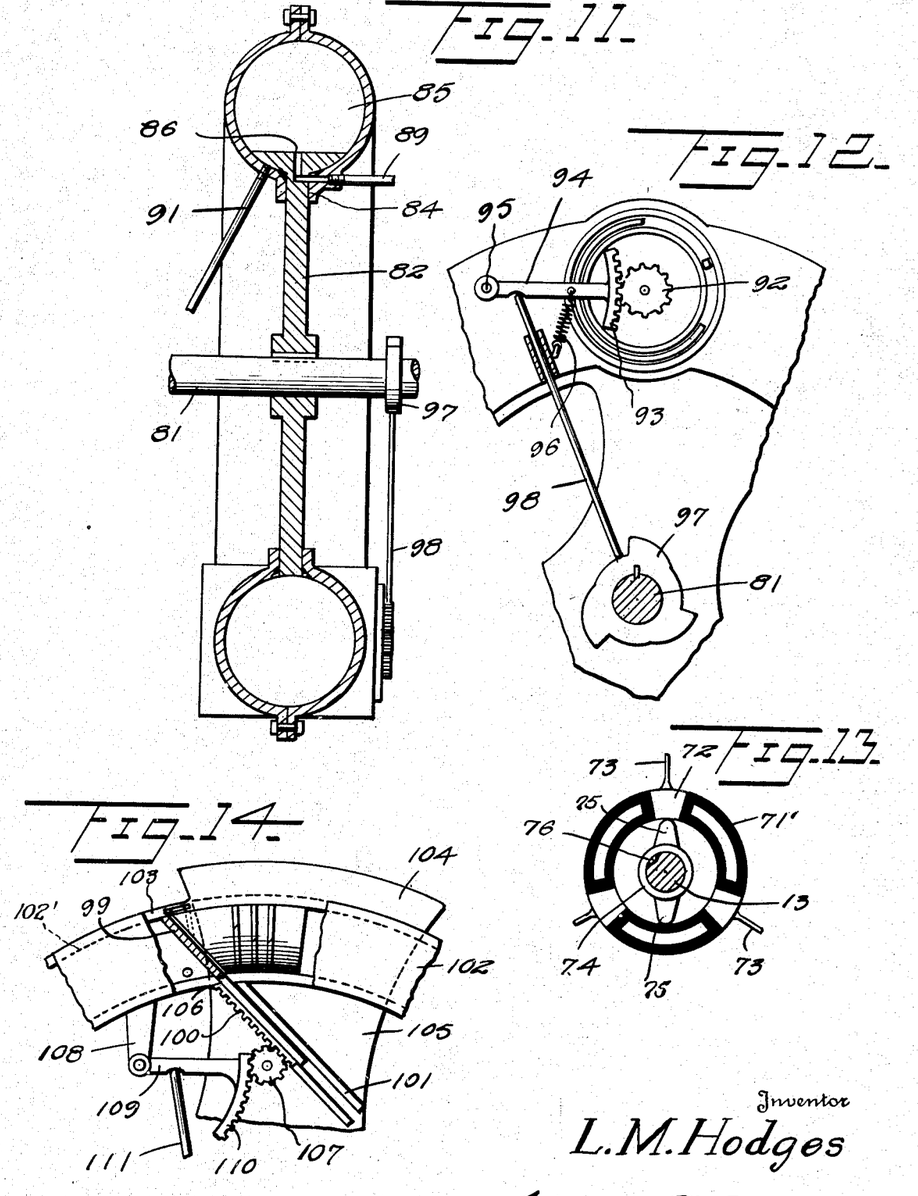
Figure 11 is a sectional view taken upon the line 11—11 of Figure 10.
Figure 12 is a view illustrating a modified form of mechanism for operating a partitioning valve of the structure illustrated in Figure 10.
Figure 13 is a view illustrating in elevation the rotary contact mechanism employed for distributing electric current to the spark creating devices of the engine as illustrated in Figures 1 and 2.
Figure 14 is a view illustrating another form of partitioning abutment valve and the method of operating the same.
Figure 15:
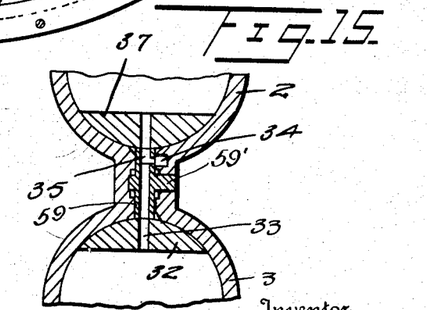
Figure 15 is a section on the line 15—15 of Figure 1.

In Figures 10 and 11 there is illustrated a single cylinder form of the present invention wherein the cylinder is designed to remain stationary, being supported in any suitable manner, while the pistons, the drive shaft and the connecting means between the same, are rotated. The fixed single cylinder is indicated generally by the numeral 77 and is here illustrated as having four transversely extending cylindrical chambers 78 in each of which a rotary partitioning abutment valve, indicated generally by the numeral 79, is disposed. These partitioning valves are of the same construction as those illustrated and described in connection with the double cylinder engine previously described. Adjacent each upon the right hand side thereof, when considering the hereinafter described pistons as moving in a clockwise direction through the cylinder, is a spark plug 80.

The numeral 81 indicates the shaft to which is keyed a web 82 which is integral with the annulus 83. This annulus, corresponding to the annulus 59, rotates in a slot 84 formed in the inner side of the annular cylinder 77 and extends to the inner surface of this annular cylinder and has fixed thereto the pistons or vanes 85. Each of the pistons 85 has a port 86 passing from its trailing end through the side which is attached to the annulus 83 and communicating with a fuel intake chamber 87 formed in and opening through one side of the annulus. At suitably spaced intervals the body of the cylinder has fuel intake ports 88 formed therein to be covered by the open side of the chamber 87, and each of these ports 88 has a suitable fuel supply tube or pipe 89 leading thereto.

Adjacent the side of each partitioning valve 79

79 toward which the pistons approach, the wall of the cylinder is provided with an exhaust passage 90 to which may be coupled a suitable lead off pipe 91. While in this single cylinder construction several pistons and control valves or partitions have been shown, it is to be understood that in each form of the engine may be constructed any desired number of pistons and partitioning valves.

For the operation of the oscillatory type of partitioning valve illustrated in Figure 10 there may be employed the mechanism illustrated in Figure 12 wherein each of the valves at one end is provided with a spur gear 92 which has in connection therewith an arcuate rack 93 carried by the arm 94 which is oscillatably attached, as at 95, to the side of the cylinder. A control spring 96 coupling the arm 94 with the cylinder normally tends to oscillate the rack in a direction to maintain the valve closed.

The opening of the valves 79 at the proper intervals is effected by a three point cam 97 which is mounted upon the shaft 81. Each of the arms 94 is engaged by one end of a push rod 98 which is mounted in a suitable guide upon the cylinder and which has its other end in contact with the cam 97 so that when a cam point passes beneath the end of a rod it will shift the same to rock the arm 94 in a direction to open the adjacent valve.

With this single cylinder form of the engine, explosive fuel, such as gasoline or the like, may be supplied through the intake passages 87 and 88 under high pressure and the same form of timing mechanism may be employed for creating a spark at the proper time to fire the fuel charge. As shown in Figure 10, one piston is in position to receive such a charge as the chamber 87 is over the port 88 and the piston has just passed the adjacent partitioning valve. A second piston is moving under its power stroke and the third is shown passing through one of the partitioning valves. This form of the engine may be employed with steam as the propulsive force, in which case the ignition system would not, of course, be employed.

While there has been illustrated in each form of the engine an oscillatory type of partitioning valve, it is to be understood that in referring in the claims to these valves as "partitioning valves" it is not intended to limit the invention to the use of the oscillatory type here shown as it is possible to employ reciprocating or otherwise shiftable partitioning valves of the character illustrated in Figure 14.

Such a reciprocating valve may comprise a plate 99 provided on one face with a rack 100 and mounted in suitable guides 101 to move into a position across the cylinder with which it is associated, obliquely to the cylinder as shown in Figure 14. In the use of a flat sliding valve of this character it may be necessary to alter slightly the mechanical structure by which the piston is supported for movement through the annular cylinder. As an example a cylinder, indicated by the numeral 102, may be provided with an external circumferential division or opening 102' for the reception of an annulus 103 similar to the annulus 59 shown between the concentric cylinders illustrated in Figure 1, and this annulus may be coupled by a suitable upwardly and laterally extending flange structure 104 with the webs or spokes 105 which are supported by the engine shaft, not shown. This lateral disposition of the web 105 allows clearance within the annular cylinder for the movement of the partitioning plate 99 and the guides 101 for this plate may be attached to or cast integral with the cylinder as to extend obliquely thereto, as illustrated, and the cylinder may be provided with a slot 106 to receive the slide, the slot being, of course, aligned with the area between the guides 101. Any suitable supporting means carried by one of the guides, may be provided for mounting a spur gear 107 in position to engage the rack 100 on the partition slide or plate 99, and oscillatably supported upon the inside of the annular cylinder upon a stud 108 or in any other suitable manner, is an arm 109 carrying a rack 110 which meshes with the gear 107. This arm 109 may be oscillated at the proper intervals by mechanism such as is shown in Figure 12 for the oscillation of the arm 94, a portion of a push rod being shown and indicated by the numeral 111. It will be obvious to those skilled in the art that the single cylinder type of engine illustrated in Figs. 10 and 11 may be used in multiple if desired so that the power of a number of units of the character illustrated might be applied to a driving shaft. It is also to be understood that the engine whether constructed with the single or double cylinders may be constructed with the cylinders stationary or rotatable as preferred.

It will be readily apparent to those familiar with the art of internal combustion engines, that the entire structure as herein described may readily be employed as Diesel type engines by the employment in association with the structures, of the usual fuel injectors employed in association with engines of this particular type.

What is claimed is:

1. A rotary engine, comprising a shaft, a pair of concentrically arranged annular cylinders mounted upon and secured to the shaft to rotate therewith, pistons in the cylinders, carrying means for the pistons arranged to rotate about the shaft, gear means coupling said carrying means with the shaft to rotate the latter oppositely to the direction of movement of the pistons, means for introducing a fuel mixture into one of the cylinders, means for transferring the fuel mixture from the one cylinder into the other cylinder, shiftable partitioning valves in each cylinder having opened and closed positions against one of which in one cylinder, when in closed position, an introduced charge is compressed by the piston therein and against one of which in the other cylinder, when in closed position, the compressed fuel charge exerts its expansive power upon ignition to effect the relative movement of the last mentioned valves and the piston in the said other cylinder, the partitioning valves when in opened position permitting passage of the piston and carrying means, mechanism for actuating the valves to opened or closed position, and mechanism for igniting the fuel mixture in the said other cylinder.

2. A rotary engine, comprising a pair of concentrically arranged annular cylinders, a shaft extending through the axial centers of the cylinders and having the latter secured thereto, oscillatory partitioning units extending transversely through both cylinders, said units having passageways adapted to coincide with the interior diameter of the cylinder when the unit is turned to one position, a pair of pistons one disposed in each cylinder, means connecting the pistons to effect their movement in the same direction through the cylinders, means forming a supporting driving connection between the pistons and the shaft for driving the shaft and cylinder oppositely to the pistons, mechanism operating synchronously with the pistons to oscillate the units to a position to facilitate passage of the pistons, means for introducing a fuel mixture for compression between a piston and an oscillatory unit of one cylinder, means for transferring the compressed fuel mixture into the other cylinder between the piston and the oscillatory unit thereof, and means for igniting the fuel mixture after transferal into the said other cylinder.

3. A rotary engine comprising a shaft, a pair of concentrically arranged annular cylinders concentric with and secured to the shaft to turn therewith, an annulus rotatably held between the cylinders, a piston in each cylinder, said pistons being fixed to the annulus to turn together with the annulus, a driving coupling between the annulus and shaft whereby the shaft and cylinders are rotated oppositely to the pistons, shiftable partitioning units in the cylinders which are so constructed and arranged that when in one position the pistons and attached part of the annulus are permitted to pass and when in another position closing the cylinders ahead of and behind the pistons, mechanism for actuating said units in timed relation with the movements of the pistons, means for introducing a fuel charge into one of the cylinders, means for exhausting spent gases from the other cylinder, means for transferring a fuel charge which has been compressed in the said one of the cylinders between the piston therein and a partitioning unit, into the other cylinder between the piston therein and a partitioning unit, and means for igniting the transferred fuel charge in the said other cylinder.

4. A rotary engine, comprising a shaft, a pair of concentrically arranged annular cylinders concentric with and secured to the shaft to turn therewith, an annulus rotatably held between the cylinders, a piston in each cylinder, said pistons being fixed to the annulus to turn together with the annulus, a driving coupling between the annulus and shaft whereby the shaft and cylinders are rotated oppositely to the pistons, shiftable partitioning units in the cylinders so constructed and arranged that when in one position they permit the pistons to pass and when in another position they close the cylinders ahead of and behind the pistons, means for introducing a fuel charge into one of the cylinders, means for exhausting spent gases from the other cylinder, means for transferring a fuel charge which has been compressed in the said one of the cylinders between the piston therein and a partitioning unit, into the other cylinder between the piston therein and a partitioning unit, means for igniting the transferred fuel charge in the said other cylinder, a body rotatably mounted concentrically with the cylinders and connected with said annulus, and means coupled with said units and engaged by said body for alternately actuating the partitioning units to first open and then closed position.

5. A rotary engine, comprising a shaft, a pair of concentrically arranged annular cylinders encircling and concentric with the shaft and secured thereto to rotate therewith, an annulus disposed between the cylinders for rotary movement relative thereto, a circular plate disposed at one side of the cylinders and having a central opening through which the shaft passes, means carried by the said annulus for supporting the plate relative to the cylinders, gear connecting means between the plate and the shaft, a pair of pistons one being disposed within each cylinder and each secured to the annulus, partitioning units shiftable alternately, first to open and then to close the cylinders ahead of and behind the pistons therein to form compression and expansion chambers, shiftable elements carried by the cylinders and coupled with the units, means carried by said circular plate for intermittently contacting said elements to effect the opening and closing of the units in timed relation with the pistons, means for introducing a fuel mixture into one of the cylinders, means for carrying off spent fuel gases from the other of the cylinders, means for transferring a compressed fuel mixture from one cylinder to the other cylinder between a piston and a unit, and means for igniting a transferred charge of the fuel mixture.

6. A rotary engine, comprising a power shaft, a pair of annular cylinders arranged concentrically with the shaft, the inner one of said cylinders being secured to the shaft to rotate therewith and the outer cylinder encircling and being mounted upon the inner cylinder, an annulus slidably secured between the cylinders and having an edge exposed in each cylinder, a plurality of arms secured to the annulus and extending laterally therefrom, a circular plate encircling the shaft and secured to said arms to rotate with the same and the annulus relative to the cylinders, gear means connecting said plate with the shaft, a piston in each cylinder, said pistons being secured in partially overlapping relation to the annulus, a plurality of rotatably mounted partitioning units each extending transversely through a cylinder, said units being arranged in pairs of slightly offset planes extending radially of the cylinders and each of said units being transversely recessed to permit a piston to pass therethrough when the unit is in one position, actuating arms connected with said units, cam means carried by said plate for effecting the rotation of the units in timed relation with the movements of the pistons in the cylinders, means for introducing a fuel mixture into one cylinder, means for conducting off spent gases from the other cylinder, and means for effecting the passage of a compressed fuel charge from an area between a piston and a unit of one cylinder into the other cylinder to an area between the piston and an adjacent unit, and spark creating means in the said other cylinder for igniting the charge.

7. A rotary engine, comprising a power shaft, a pair of annular cylinders arranged concentrically with the shaft, the inner one of said cylinders being secured to the shaft to rotate therewith and the outer cylinder encircling and being mounted upon the inner cylinder, an annulus slidably secured between the cylinders and having an edge exposed in each cylinder, a plurality of arms secured to the annulus and extending laterally therefrom, a circular plate encircling the shaft and secured to said arms to rotate with the same and the annulus relative to the cylinders, gear means connecting said plate with the shaft, a piston in each cylinder, said pistons being secured in partially overlapping relation to the annulus, a plurality of oscillatably mounted partitioning units each extending transversely through a cylinder, said units being arranged in pairs of slightly offset planes extending radially of the cylinders and each of said units being formed in a manner to permit a piston to pass therethrough when the unit is in one position, actuating arms connected with said units, cam means carried by said circular plate for effecting the rotation of the units in timed relation with the movements of the pistons in the cylinders, means for introducing fuel into one cylinder, means for conducting off spent gases from the other cylinder, means for effecting the passage of a compressed fuel charge from an area between a piston and a unit of one cylinder into the other cylinder to an area between the piston and an adjacent unit, spark creating means in the said other cylinder for igniting the charge, a ring-gear encircling the outer cylinder, and gear-means connected with the ring-gear for taking off power from the rotating cylinders.

8. An engine of the character described comprising an annular cylinder having a circumferentially extending wall slot, a piston in the cylinder, an annulus in and closing said slot and adapted to have rotary motion therein relative to the cylinder wall and coaxially with the cylinder, said annulus being joined to the piston, a shaft carrying said annulus, valve means for partitioning the cylinder, actuating mechanism for said valve, said valve being so constructed and arranged that when in one position it permits the passage of the piston thereby in its movement through the cylinder, means for introducing an expansive propulsive medium under pressure into the cylinder at timed intervals and between the piston and said valve when the latter is in cylinder-closing position comprising a chamber in the face of a wall of said slot and covered by the annulus and a passageway leading from that face of the annulus which covers the chamber through the periphery of the annulus into the cylinder, and means for exhausting the spent propulsive medium.

9. In a rotary engine including an annular cylinder having a circumferentially extending recess in the wall thereof, a piston in the cylinder adapted to move continuously therethrough, an annulus disposed in said recess and connected with the piston and having its peripheral surface exposed in the cylinder, and a shaft extending axially of the annular cylinder and coupled with the annulus, means for sealing the contacting surfaces between the annulus and the sides of the recess comprising a sealing ring countersunk in the inner surface of the cylinder at each side of the annulus, rings countersunk in the opposing faces of the recess and abutting the adjacent sides of the annulus, and laterally extending ribs formed upon the sides of the annulus and providing support against which said rings bear and by which they are maintained in position between the faces of the recess and the opposing surfaces of the annulus.

10. In an internal combustion engine, an annular cylinder having a continuous wall slot, an annulus closing said slot and adapted to move therein concentrically with the cylinder, the cylinder and annulus being designed to move relatively in opposite directions, a piston in the cylinder which is secured to the annulus to move therewith, a partitioning valve in the cylinder adapted to partition the same, mechanism operating said valve into partitioning and non-partitioning positions relative to the piston, exhaust means for the cylinder, and means for introducing a piston propelling medium into the cylinder between the piston and valve comprising a medium receiving chamber in the face of a wall of said slot, means for conducting the medium into said chamber, and a passage leading from a face of the annulus which passes across the chamber in said wall face, into the cylinder, said chamber being in close proximity to the valve.

11. An internal combustion engine, comprising an annular cylinder having a continuous slot in the inner side of the wall thereof, an axle extending axially of the annular cylinder, a piston in the cylinder and designed to move continuously in one direction therein, an annulus closing said slot and having the piston secured thereto, means joining the annulus with the axle, supporting means for the cylinder, the cylinder and annulus being both movable coaxially in opposite directions, a cylindrical partitioning valve extending across and through the cylinder and adapted to oscillate therein to open and close the cylinder respectively in front of and behind the piston, mechanism for oscillating the valve synchronously with the piston, means for introducing a combustible fuel mixture into the cylinder between the closed valve and the piston immediately after the piston has passed the valve, means for firing the mixture, and means for exhausting spent fuel gases from the cylinder after the piston has passed a particular point therein.

12. In an engine of the character described, including a cylinder and a piston adapted to pass therethrough, a partition-valve mechanism for the cylinder comprising a cylindrical body arranged to extend transversely through the cylinder and having a transverse opening for the movement of the piston therethrough, a broken-ring fixed at one end of and concentrically of the cylindrical body, the ends of said ring being spaced a substantial distance apart, a movement limiting key carried by the said end of the cylindrical body and moved by the latter cylinder between the said spaced ends of the ring, and oscillating means operatively coupled with the cylindrical body to effect its oscillation in timed relation with the movements of the piston.

13. In an engine of the character described including an annular cylinder, a piston therein and adapted to move continuously in one direction therethrough, a partitioning valve-mechanism for the cylinder comprising a cylindrical body extending transversely through the cylinder and having a transverse opening for the movement of the piston therethrough, means for introducing a combustible fuel into the cylinder between the valve and the piston, immediately after the passage of the piston through the cylindrical body, means for exhausting spent fuel gases from the cylinder after the piston has travelled a predetermined distance in the cylinder, and means for oscillating said cylindrical body synchronously with the movement of the piston through the cylinder comprising a broken ring fixed at one end of the cylindrical body and in concentric relation therewith, a movement-limiting key carried by the said end of the cylindrical body and disposed between the ends of said ring, a gear secured to an end of the cylindrical body, a rack oscillatably mounted upon the cylinder and having toothed connection with the gear, and means for effecting the reciprocation of the rack to impart oscillatory movement to the cylindrical body.

LOWELL M. HODGES.